US008133403B2

(12) United States Patent
Li et al.

(10) Patent No.: US 8,133,403 B2
(45) Date of Patent: Mar. 13, 2012

(54) SYSTEM AND METHOD FOR CONTROLLING THE APPLICATION OF ACID ETCHERS OR CLEANERS BY MEANS OF COLOR-CHANGING DYE

(75) Inventors: Jigui Li, Santa Ana, CA (US); Ming-Ren Tarng, Santa Ana, CA (US)

(73) Assignee: Behr Process Corporation, Santa Ana, CA (US)

( * ) Notice: Subject to any disclaimer, the term of this patent is extended or adjusted under 35 U.S.C. 154(b) by 614 days.

(21) Appl. No.: 11/888,007

(22) Filed: Jul. 31, 2007

(65) Prior Publication Data
US 2009/0032497 A1    Feb. 5, 2009

(51) Int. Cl.
  C03C 15/00 (2006.01)
  C03C 25/68 (2006.01)
  H01L 21/302 (2006.01)
  H01L 21/461 (2006.01)

(52) U.S. Cl. .............................. 216/83; 438/689; 438/745

(58) Field of Classification Search .................... 216/83
See application file for complete search history.

(56) References Cited

U.S. PATENT DOCUMENTS

| | | | |
|---|---|---|---|
| 3,926,830 A | 12/1975 | Horiguchi et al. | |
| 4,032,466 A | 6/1977 | Otrhalek et al. | |
| 4,105,576 A | 8/1978 | Seidenberger | |
| 4,149,852 A | 4/1979 | Tiru et al. | |
| 4,212,759 A | 7/1980 | Young et al. | |
| 4,297,148 A | 10/1981 | Zervopoulos | |
| 4,501,680 A | 2/1985 | Aszman et al. | |
| 4,581,042 A | 4/1986 | Willmore | |
| 4,608,086 A | 8/1986 | Dodge | |
| 4,715,980 A | 12/1987 | Lopes et al. | |
| 4,738,876 A | 4/1988 | George et al. | |
| 4,749,508 A | 6/1988 | Cockrell, Jr. et al. | |
| 4,855,069 A | 8/1989 | Schuppiser et al. | |
| 4,877,459 A | 10/1989 | Cockrell, Jr. et al. | |
| 4,971,631 A | 11/1990 | Sallee et al. | |
| 5,057,303 A | 10/1991 | Casey | |
| 5,110,492 A | 5/1992 | Casey | |
| 5,223,168 A | 6/1993 | Holt | |
| 5,286,403 A | 2/1994 | O'Dwyer et al. | |
| 5,364,551 A | 11/1994 | Lentsch et al. | |
| 5,424,000 A | 6/1995 | Winicov et al. | |
| 5,460,632 A * | 10/1995 | Ruggiero et al. | ............ 8/552 |
| 5,656,580 A | 8/1997 | Carrie et al. | |
| 5,686,399 A | 11/1997 | Bianchetti et al. | |

(Continued)

OTHER PUBLICATIONS

A.J. Salle, A Modified Methyl Organce Indiciator: Suuirtable for use with artificial lgiht, Apr. 1926, The Journal of Ingectious Diseases, vol. 38 No. 4, pp. 293-294.*

*Primary Examiner* — Binh X Tran
*Assistant Examiner* — Stephanie Duclair
(74) *Attorney, Agent, or Firm* — Rathe Lindenbaum LLP (57) ABSTRACT

An acidic etcher solution for etching a substrate's surface. The acidic etcher solution includes an acid and a pH indicator, the pH indicator having at least one color transition at a pH below 7. The acidic etcher solution having an initial color at an initial pH when applied to the surface to allow determination of the evenness of the coating and the etcher having a second color at a second pH higher than the first pH wherein visual inspection allows for a determination that the etcher is substantially finished reacting.

9 Claims, 10 Drawing Sheets

U.S. PATENT DOCUMENTS

| | | |
|---|---|---|
| 5,733,859 A | 3/1998 | Carrie et al. |
| 5,792,384 A | 8/1998 | Warren |
| 5,797,986 A | 8/1998 | Rolando et al. |
| 5,902,411 A | 5/1999 | Williams et al. |
| 5,912,219 A | 6/1999 | Carrie et al. |
| 5,958,854 A | 9/1999 | Laing et al. |
| 5,981,449 A | 11/1999 | Rapisarda et al. |
| 5,998,358 A | 12/1999 | Herdt et al. |
| 6,127,330 A | 10/2000 | Bonett |
| 6,147,002 A | 11/2000 | Kneer |
| 6,153,572 A | 11/2000 | Stamm |
| 6,265,366 B1 | 7/2001 | Bonett |
| 6,432,395 B1 | 8/2002 | Rochon et al. |
| 6,432,906 B1 | 8/2002 | Carlson et al. |
| 6,524,624 B1 | 2/2003 | Morelli et al. |
| 6,551,985 B1 | 4/2003 | Bianchetti et al. |
| 6,583,103 B1 | 6/2003 | Klinkhammer |
| 6,613,728 B1 | 9/2003 | Sirianni et al. |
| 6,627,590 B1 | 9/2003 | Sherry et al. |
| 6,645,930 B1 | 11/2003 | Wallis et al. |
| 6,677,287 B1 | 1/2004 | Willman et al. |
| 6,701,940 B2 | 3/2004 | Tsibouklis et al. |
| 6,719,614 B2 | 4/2004 | Miller et al. |
| 6,794,346 B2 | 9/2004 | Wick et al. |
| 2002/0155969 A1 | 10/2002 | Rees et al. |
| 2003/0092597 A1 | 5/2003 | Avery et al. |
| 2003/0102457 A1 | 6/2003 | Miller |
| 2003/0220213 A1 | 11/2003 | Bober |
| 2005/0124519 A1 | 6/2005 | Sherry et al. |
| 2005/0170982 A1 | 8/2005 | Boone et al. |
| 2005/0276769 A1 | 12/2005 | Herrlein et al. |
| 2006/0051266 A1 | 3/2006 | Green et al. |
| 2006/0293205 A1* | 12/2006 | Chung .................. 510/383 |

* cited by examiner

| INDICATOR | pH=0 | pH=1 | pH=2 | pH=3 | pH=4 | pH=5 | pH=6 | pH=7 | pH=8 | pH=9 | pH=10 | pH=11 | pH=12 | pH=13 | pH=14 |
|---|---|---|---|---|---|---|---|---|---|---|---|---|---|---|---|
| CRESOL RED | RED | ORANGE | YELLOW | YELLOW | YELLOW | YELLOW | YELLOW | ORANGE | ORANGE | RED | RED | RED | RED | RED | RED |
| METHYL VIOLET | YELLOW | GREEN | BLUE | BLUE | BLUE | BLUE | BLUE | BLUE | BLUE | BLUE | BLUE | BLUE | BLUE | BLUE | BLUE |
| METACRESOL PURPLE | RED | ORANGE | ORANGE | ORANGE | YELLOW | YELLOW | YELLOW | BROWN | BROWN | BROWN | PURPLE | PURPLE | PURPLE | PURPLE | PURPLE |
| THYMOL BLUE | RED | ORANGE | ORANGE | YELLOW | YELLOW | YELLOW | YELLOW | YELLOW | GREEN | GREEN | BLUE | BLUE | BLUE | BLUE | BLUE |
| CONGO RED | BLUE | BLUE | BLUE | PURPLE | PURPLE | PURPLE | RED | RED | RED | RED | RED | RED | RED | RED | RED |
| BROMOPHENOL BLUE | YELLOW | YELLOW | YELLOW | GREEN | GREEN | BLUE | BLUE | BLUE | BLUE | BLUE | BLUE | BLUE | BLUE | BLUE | BLUE |
| METHYL ORANGE | RED | RED | RED | ORANGE | ORANGE | YELLOW | YELLOW | YELLOW | YELLOW | YELLOW | YELLOW | YELLOW | YELLOW | YELLOW | YELLOW |
| BROMOCRESOL GREEN | YELLOW | YELLOW | YELLOW | YELLOW | GREEN | GREEN | BLUE | BLUE | BLUE | BLUE | BLUE | BLUE | BLUE | BLUE | BLUE |
| ALIZARIN RED S | YELLOW | YELLOW | YELLOW | YELLOW | ORANGE | ORANGE | ORANGE | RED | RED | RED | RED | RED | RED | RED | RED |
| METHYL RED | RED | RED | RED | RED | RED | ORANGE | ORANGE | YELLOW | YELLOW | YELLOW | YELLOW | YELLOW | YELLOW | YELLOW | YELLOW |
| BROMOCRESOL PURPLE | YELLOW | YELLOW | YELLOW | YELLOW | YELLOW | BROWN | BROWN | PURPLE | PURPLE | PURPLE | PURPLE | PURPLE | PURPLE | PURPLE | PURPLE |

FIG. 1A

| INDICATOR | pH=0 | pH=1 | pH=2 | pH=3 | pH=4 | pH=5 | pH=6 | pH=7 | pH=8 | pH=9 | pH=10 | pH=11 | pH=12 | pH=13 | pH=14 |
|---|---|---|---|---|---|---|---|---|---|---|---|---|---|---|---|
| CHLOROPHENOL RED | YELLOW | YELLOW | YELLOW | YELLOW | YELLOW | ORANGE | ORANGE | RED | RED | RED | RED | RED | RED | RED | RED |
| ERIOCHROME BLACK | RED | RED | RED | RED | RED | BLACK | BLACK | BLUE | BLUE | BLUE | BLUE | BLUE | BLUE | BLUE | BLUE |
| BROMOTHYMOL BLUE | YELLOW | YELLOW | YELLOW | YELLOW | YELLOW | YELLOW | GREEN | GREEN | BLUE | BLUE | BLUE | BLUE | BLUE | BLUE | BLUE |
| PHENOL RED | YELLOW | YELLOW | YELLOW | YELLOW | YELLOW | YELLOW | YELLOW | ORANGE | ORANGE | RED | RED | RED | RED | RED | RED |
| NEUTRAL RED | RED | RED | RED | RED | RED | RED | RED | ORANGE | ORANGE | AMBER | AMBER | AMBER | AMBER | AMBER | AMBER |
| CRESOLPTHALEIN | CLEAR | CLEAR | CLEAR | CLEAR | CLEAR | CLEAR | CLEAR | CLEAR | PINK | PINK | PINK | RED | RED | RED | RED |
| PHENOLPTHALEIN | CLEAR | CLEAR | CLEAR | CLEAR | CLEAR | CLEAR | CLEAR | CLEAR | LT. PINK | LT. PINK | LT. PINK | PINK | PINK | PINK | PINK |
| THYMOLPTHALEIN | CLEAR | CLEAR | CLEAR | CLEAR | CLEAR | CLEAR | CLEAR | CLEAR | CLEAR | LT. BLUE | LT. BLUE | BLUE | BLUE | BLUE | BLUE |
| ALIZARIN YELLOW R | YELLOW | YELLOW | YELLOW | YELLOW | YELLOW | YELLOW | YELLOW | YELLOW | YELLOW | YELLOW | ORANGE | ORANGE | ORANGE | RED | RED |
| BRILLIANT CRESYL BLUE | LT. BLUE | LT. BLUE | LT. BLUE | LT. BLUE | LT. BLUE | LT. BLUE | LT. BLUE | LT. BLUE | LT. BLUE | LT. BLUE | LT. PUR | LT. PUR | LT. PUR | PINK | PINK |
| INDIGO CARMINE | BLUE | BLUE | BLUE | BLUE | BLUE | BLUE | BLUE | BLUE | BLUE | BLUE | BLUE | GREEN | GREEN | GREEN | YELLOW |
| THIAZOL YELLOW G | YELLOW | YELLOW | YELLOW | YELLOW | YELLOW | YELLOW | YELLOW | YELLOW | YELLOW | YELLOW | YELLOW | YELLOW | ORANGE | ORANGE | AMBER |

SYSTEM AND METHOD FOR CONTROLLING THE APPLICATION OF ACID ETCHERS OR CLEANERS BY MEANS OF COLOR-CHANGING DYE

BACKGROUND OF THE INVENTION

The present invention relates generally to the field of etching and cleaning. Specifically, the present invention relates to methods and compositions for application of etchers and cleaners having a color-changing component for control of the degree of etching.

Etchers are compounds used typically to remove a portion of a surface. Acid etchers are widely used in the coatings industry to etch surfaces, such as concrete floors, before applying a coating. The etching process cleans the surface and yields a surface profile suitable for obtaining a good application of the coating, as well as promoting better adhesion to the substrate. Most etchers are made of organic or inorganic acids or salts. As such, most current etchers are colorless or contain very light color.

Current form of etchers have several general problems. First, a very common phenomenon is that the surface cannot be uniformly etched if the thickness of the etching product is not applied uniformly. For example, a light application of the etching product on the area to be etched will have degraded performance compared to a similar area with a much heavier application. With colorless etchers, it is very difficult for a user to determine if a uniform application of the etcher has been made. Second, it is very difficult to judge when the etcher has lost all of its etching capability. Etchers react with the surface, such as concrete, which results in a gradual neutralization of the acid. Thus, at some point the etcher will become essentially neutral, losing its etching ability; but a user has no easy way to determine when that has occurred. However, it is often desirable to remove this residual etcher rather than to simply leave it on the surface Third, it is difficult to determine when it is the proper time for the user to rinse the etched area if there is no clear distinction between areas that have been properly etched as compared to those that still require time for the product to etch fully. This is particularly important in more precise etching applications where a certain amount of etcher is to be applied for a certain time.

Thus, there is a need for an etching composition and methods for using the same that provides a color-changing mechanism which provides a sensitive indicator of the proper level of completion of a desired process.

SUMMARY OF THE INVENTION

One embodiment of the invention relates to an etching composition and methods for using the same that provides a color-changing mechanism associated with the degree of etching. In one embodiment, the main components of the etching product include: pH indicating dyes, acids (e.g., both organic and inorganic), and other additives. The pH indicators will exhibit different colors (or a lack of color) under different pH values. After the acid etcher is applied over substrates, the pH value of the product will increase gradually due to the reaction between the etcher and the substrate. Correspondingly, the color of the pH indicator will change coincidentally with the change in pH of the etcher. For example, in one embodiment wherein the pH indicator is bromocresol green, the color of bromocresol green is yellow/orange (depending its concentration) at a pH less than 2.5. Subsequently, its color will change to light green at pH 3 and to blue when the pH is larger than 3.5 as the acid etcher reacts with the substrate.

The present invention allows a user to readily monitor the application and reaction of the etcher. In one embodiment, the etching product can clearly show if the etching product is evenly applied over the etched substrates. The etching product can therefore inform the end user when the etching process is complete. The etching product can also indicate when the user can rinse the substrate and when the rinsing process is complete. Overall, the present invention can serve as a guide for end users about how to utilize fully the etching power of the etching product and when to proceed to the next step of the etching application. In addition, this technology can make the etching product easier to use, help users obtain a uniformly etched substrate, and help save user time and resources.

These and other objects, advantages, and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

The present invention relates to acid etchers having a color-changing pH indicator which can enable control of the etching process. Acid etchers operate to etch or remove a surface or a portion of a surface from a substrate. Functionally, the acid etcher is added to the surface, preferably in an even coat, and allowed to react with the surface. Once the surface has been adequately etched, the etcher is typically completely rinsed from the substrate leaving the etched surface. Ideally, the etcher is applied in a quantity such that the substrate is fully etched when all of the etcher has reacted and thus been neutralized.

Figure 1A:
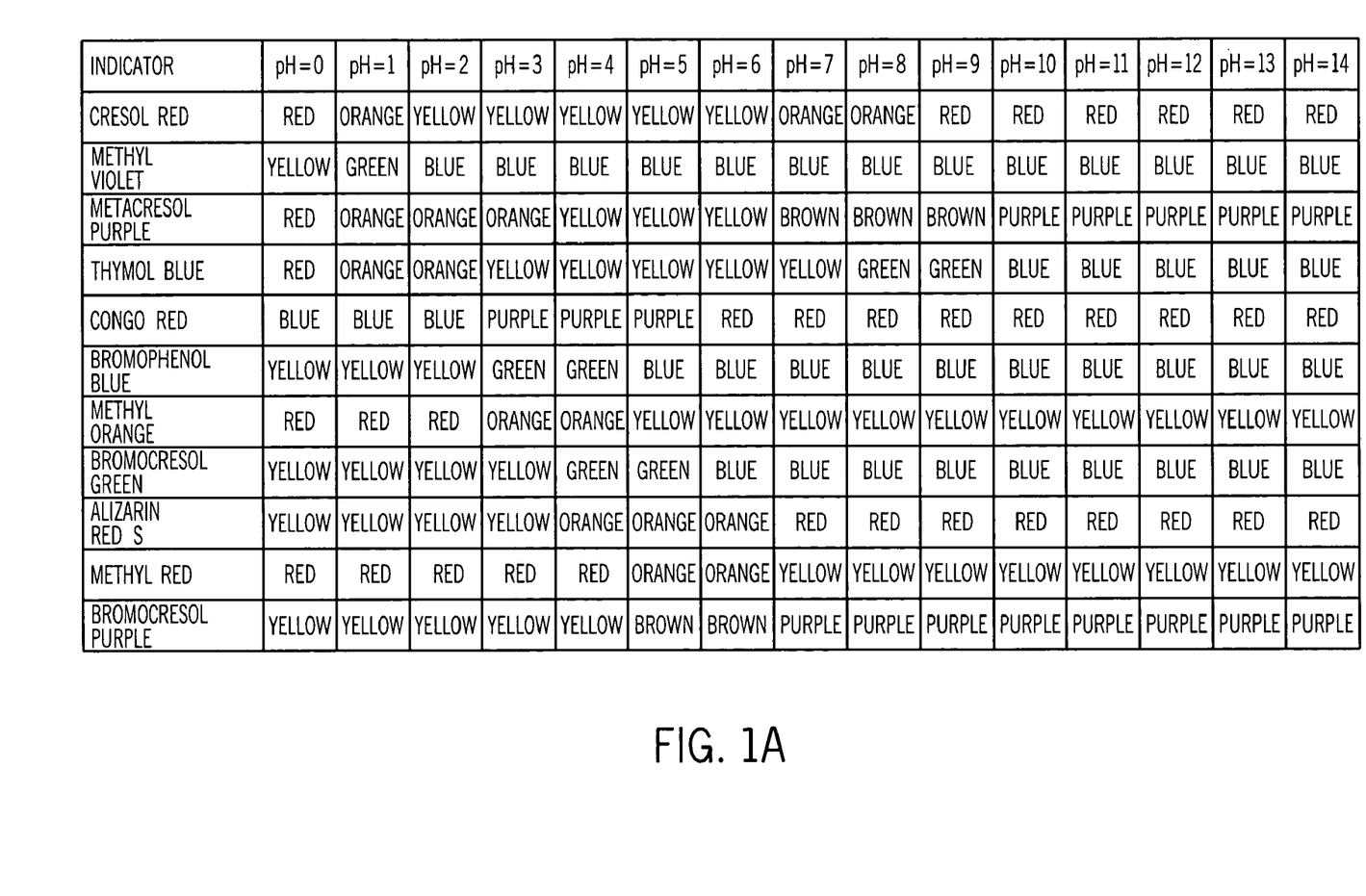
FIGS. 1A and 1B illustrate examples of pH indicators and their color changing characteristics.
Figure 1B:
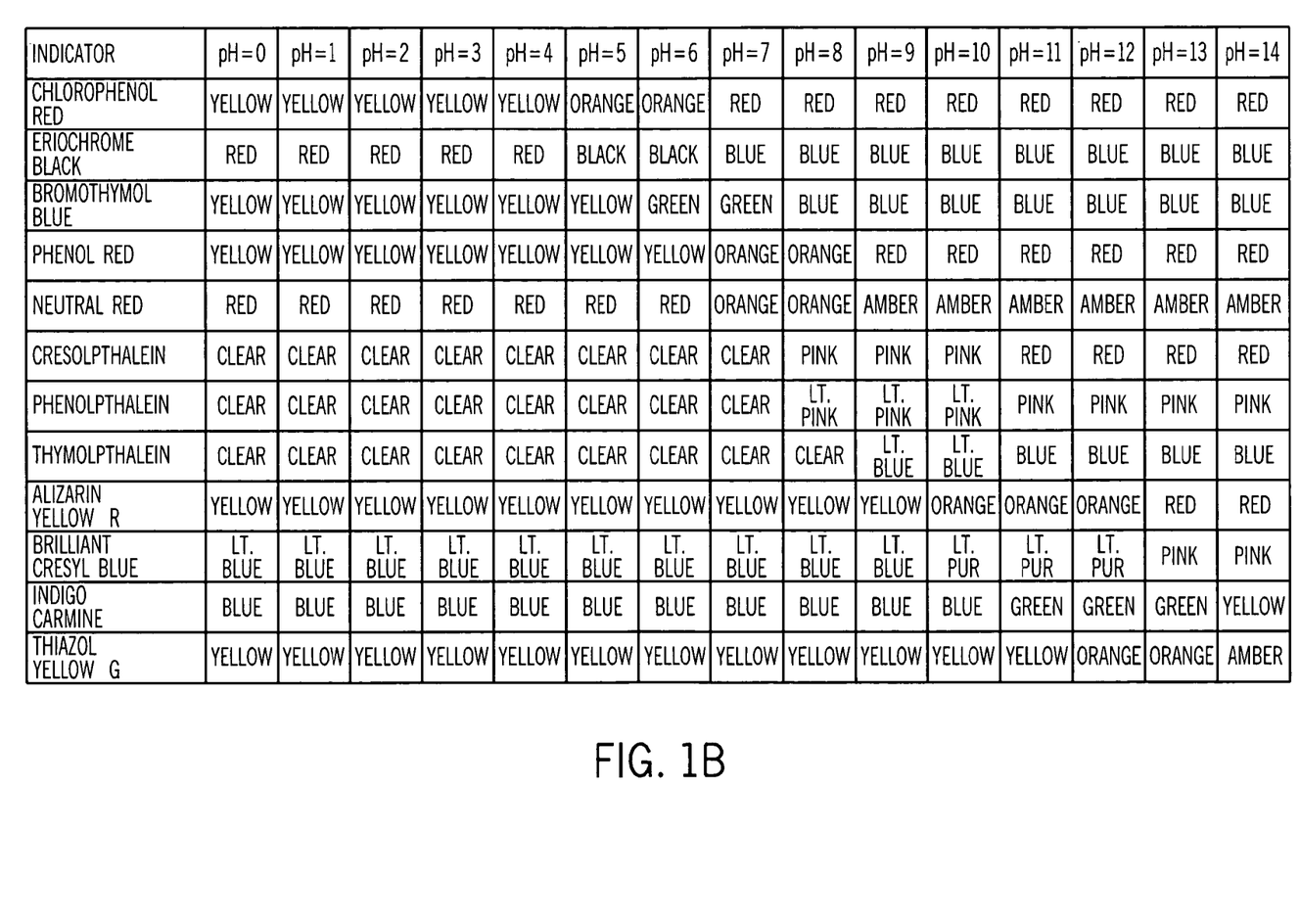

The etching chemicals of the present invention can comprise organic acid, inorganic acid, blends of organic acid and inorganic acid, and other materials that can be used for etching as understood by one of ordinary skill in the art understanding the invention and its clear implications. An exemplary list of pH indicators for use in the present invention is given in FIGS. 1A and 1B, though one of ordinary skill in the art will appreciate that other pH indicators that are not listed in FIGS. 1A and 1B are also suitable for this invention. The substrates for use in the present invention include, but are not limited to, concrete, metal, glass, plastics, and combinations thereof.

The general action of an acid etcher on a substrate is well understood in the art. Acids are normally defined as substances which produce hydrogen ions in solution. Bases are normally defined as substances which produce hydroxide ions in solution. Neutralization occurs because hydrogen ions and hydroxide ions react to produce water:

$$H^+_{(aq)} + OH^-_{(aq)} \rightarrow H_2O_{(l)}$$

This general interaction is the basis for the use of pH indicators. As referred to herein, a pH indicator is a halochromic chemical compound that is added, typically in relatively small amounts, to a solution so that the pH (acidity or alkalinity) of the solution can be determined easily, typically by visual inspection. In effect, a pH indicator is a chemical detector for protons ($H^+$). Normally, the indicator causes the color of the solution to change depending on the pH, some imparting multiple colors depending on the pH and some indicators having no color at all at certain pH. In fact, pH indicators themselves are frequently weak acids or bases. A pH indicator is a proton donor or a receiver, with some pH indicators being only a donor or receiver, while some others are a donor within one pH range and a receiver in another pH range. When introduced into a solution, such as the etcher solution as described in the present invention, pH indicators will bind to $H^+$ (proton receiver) or $OH^-$ (proton donor) ions depending on the specific indicator used. The different electron configurations resulting from this ionic interaction causes the indicator's color to change.

In one embodiment, the present invention includes one or more pH indicators. As is well understood in the art, a pH indicator is a material that can change colors based upon hydrogen-ion concentration (i.e., pH value) of a medium.

The following are three example of pH indicators which can be used in embodiments of the present invention.

Litmus

Litmus is a weak acid. It has a rather complicated molecule which for purposes of this illustration can be simplified to "HLit". The "H" is the proton, i.e. which can be given away to something else. The "Lit" is the rest of the weak acid molecule. The un-ionised litmus is red, whereas the ion is blue. There will be an equilibrium established when this acid dissolves in water. Taking the simplified version of this equilibrium:

Adding hydroxide ions (i.e. an base) results in hydroxide ions react with and remove these hydrogen ions and the equilibrium position moves to replace the lost hydrogen ions. Likewise, adding hydrogen ions (an acid) results in the hydrogen ions reacting with and removing the hydroxide ions and the equilibrium position moves to replace the lost hydroxide ions and the equilibrium position moves to remove the extra hydrogen ions. At some point during the movement of the position of equilibrium, the concentrations of the two colors will become equal. The color you see will be a mixture of the two, i.e. purple.

Methyl Orange

Methyl orange is one of the indicators commonly used in titrations. Its structure is simple enough to be able to see what is happening as it loses and gains hydrogen ions.

This change is a result of the same mechanism described above for litmus. This reaction generates the same sort of equilibrium as in the litmus case—but the colors are different. In this case, the color of the methyl orange compound is red and its ion is yellow, with the equilibrium color being orange.

Phenolphthalein

Phenolphthalein is another commonly used indicator for titrations, and it is another weak acid.

In this case, the weak acid is colorless, and its ion is bright pink. Adding extra hydrogen ions shifts the position of equilibrium to the left and turns the indicator colorless. Adding hydroxide ions removes the hydrogen ions from the equilibrium which tips the reaction to the right to replace them, thereby turning the indicator pink.

Based on their chemical structures, pH indicators come in a variety of colors that correspond with different pH values. A non-exhaustive list of examples of pH indicators and their color changing characteristics is contained in FIGS. 1A and 1B.

The present invention includes, in one embodiment, a halochromic substance and an acidic etcher in solution. The halochromic substance is such that it has a color change selected from first color to a second color, a color change from colorless to a first color, or a color change from a first color to colorless. Additional color changes or and combinations thereof are possible. An effective amount of halochromic substance is necessary for visual inspection by the naked eye. Typically an effective amount will range from 1 to 0.001% of the solution. The color change occurs substantially at a pH predetermined to correspond with an activity level of the acidic etcher indicating effective acid etching of the substrate surface. Thus, a user is able to determine when the etcher has reached completion by viewing the color status of the etching compound.

The pH indicators will exhibit different colors (or a lack of color) under different pH values. After the acid etcher is applied over substrates, the pH value of the product will increase gradually due to the reaction between the etcher and the substrate. Correspondingly, the color of the pH indicator will change coincidentally with the change in pH of the etcher. For example, in one embodiment wherein the pH indicator is bromocresol green, the color of bromocresol green is yellow/orange (depending its concentration) at a pH less than 2.5. Subsequently, its color will change to light green at pH 3 and to blue when the pH is greater than 3.5 as the acid etcher reacts with the substrate.

The acid and halochromic compound may be selected so as to achieve a desired color change at a specific pH. This may be based upon a variety of factors, including but not limited to the type of substrate which is being etched and the environment in which the etching is to occur. The point of color change may be used to indicate when the acid etcher has lost its "etching power", i.e. the acid is substantially neutralized. Alternatively, the color change may indicate when the acid etcher solution has reached a certain pH predetermined to correspond to a completion of the acid etching which is desired, which may occur before the acid is completely neutralized. Similarly, the use of a color changing compound having an initial color that differs from the substrate to which it is applied provides the added benefit to a user of indicating where the acid etcher has been applied and to what degree. For example, pure etching compounds are typically clear and thus difficult to determine where they have been applied and in what amount. The use of a pH indicator such as methyl orange imparts a red hue to the acidic etcher allowing a user to determine where the etcher has been applied and to some extent the amount of etcher based on the intensity of the color. Where the "end" color of the product differs from that of the substrate being etched, the etching product can also indicate when the user can rinse the substrate and when the rinsing process is complete. For example, the use of pure etcher provides no visual indication of when the etcher has reacted to completion or near completion. However, a product having methyl orange added to the etcher would provide a color change to orange or yellow giving a visual indication of the status of the etching. Overall, the present invention can serve as a guide for users about how to utilize fully the etching power of n etching product and when to proceed to the next step of the etching application. In addition, this technology can make the etching product easier to use, help users obtain a uniformly etched substrate, and help save user time and resources.

In accordance with the principles of the present invention the indicator should be chosen to changes color as close as possible to that equivalence point for the particular acid etcher solution being used. Since there are strong and weak acids, as well as strong and weak bases, several possible combinations are available depending on the situation. Ideally, the strength of the etcher and the interaction it will have with the surface will be known to allow for optimized selection of a pH indicator. The following non-limiting examples illustrate the logic in accordance with the principles of the present invention for selecting a pH indicator for a particular acid etcher.

Example 1

Strong Acid v Strong Base

Figure 2:
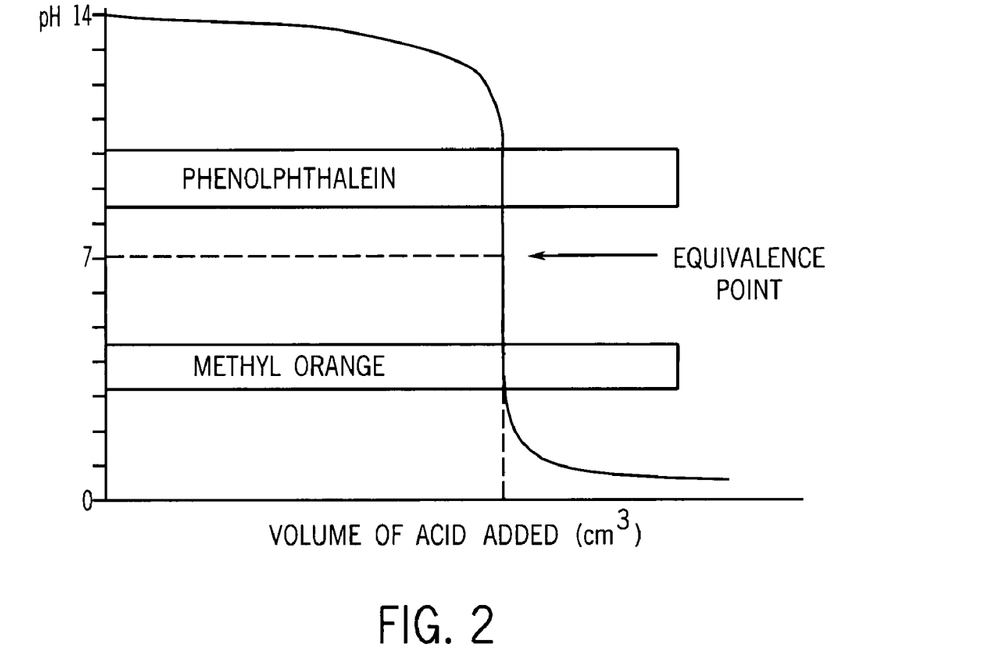
FIG. 2 is a graphical illustration of the equivalence point of a strong acid/strong base titration in comparison to phenolphthalein and methyl orange color transition ranges.

FIG. 2 shows the pH curve for adding a strong acid to a strong base. Superimposed on it are the pH ranges for methyl orange and phenolphthalein. The equivalence point is 7, but neither indicator changes color at the equivalence point. However, the transition from basic to acid is so quick (i.e., the graph is so steep at that point) that there will be virtually no difference in the volume of acid added whichever indicator is chosen.

Example 2

Strong Acid v Weak Base

Figure 3:
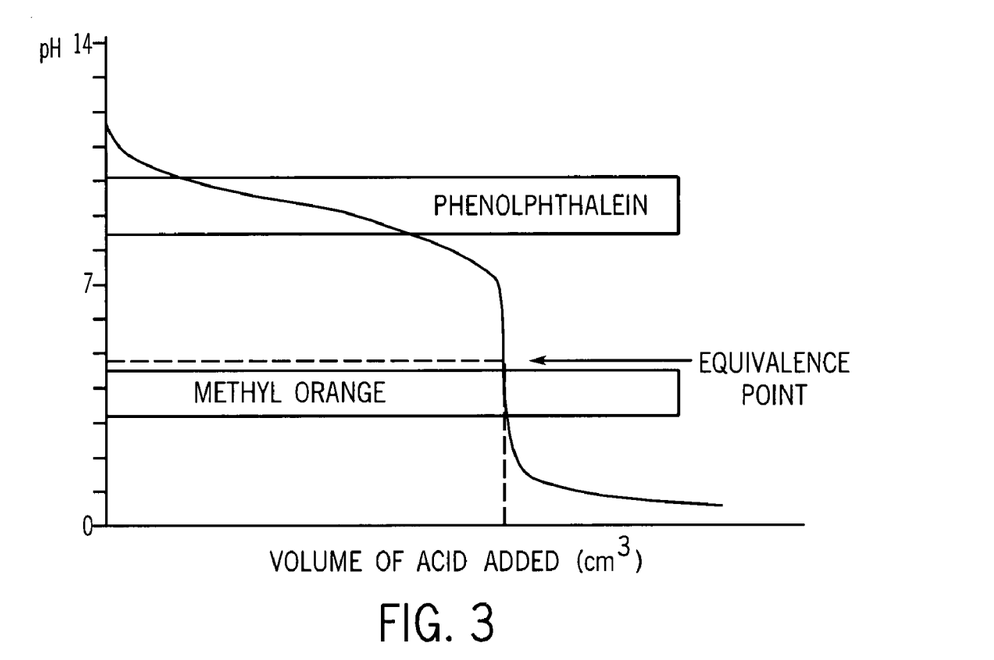
FIG. 3 is a graphical illustration of the equivalence point of a strong acid/weak base titration in comparison to phenolphthalein and methyl orange color transition ranges.

FIG. 3 illustrates the scenario of a strong acid and weak base, again comparing phenolphthalein and methyl orange. In contrast to FIG. 2, the transition to an acidic state is much more gradual. The transition point of phenolphthalein is well above the equivalents point of the titration. However, methyl orange starts to change from yellow towards orange very close to the equivalence point. Thus, phenolphthalein would be a much poorer choice for a pH indicator in this situation.

Example 3

Weak Acid v Strong Base

Figure 4:
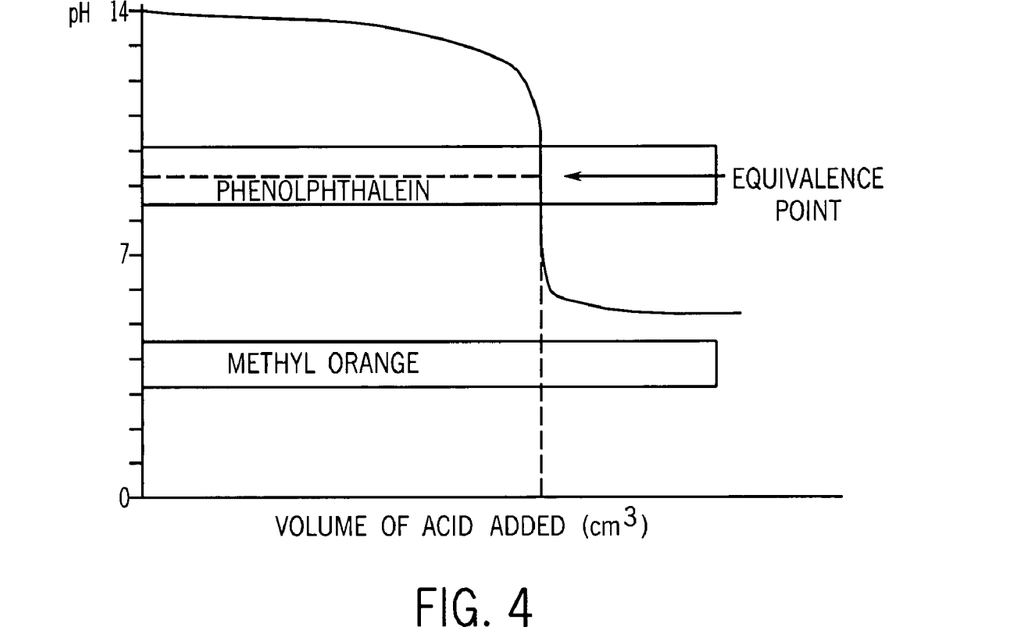
FIG. 4 is a graphical illustration of the equivalence point of a weak acid/strong base titration in comparison to phenolphthalein and methyl orange color transition ranges.

FIG. 4 illustrates a weak acid and a strong base. In contrast to the situation illustrated in FIG. 3, methyl orange is a poor choice this time because the titration's equivalence point is well above that of methyl orange. However, the phenolphthalein changes color very near the equivalence point.

Example 4

Weak Acid v Weak Base

Figure 5:
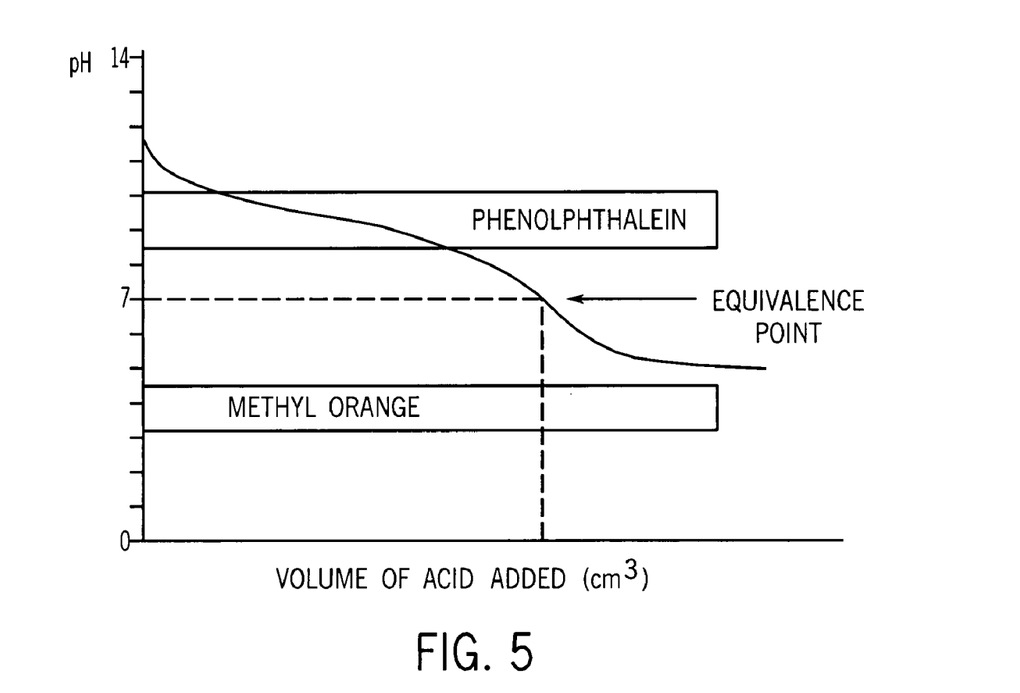
FIG. 5 is a graphical illustration of the equivalence point of a weak acid/weak base titration in comparison to phenolphthalein and methyl orange color transition ranges.

FIG. 5 illustrates a weak acid and weak base titration. The transition to acidic is much more gradual than the situations of FIGS. 2-4. Phenolphthalein will have finished changing well before the equivalence point, and methyl orange falls off the graph altogether. The curve is for a case where the acid and base are both equally weak—for example, ethanoic acid and ammonia solution. In other cases, the equivalence point will be at some other pH. However, for the situation illustrated in FIG. 5, both phenolphthalein and methyl orange are poor choices for pH indicator.

By properly selecting and adding pH indicators to an etching product, the product will have a color at its initial pH (i.e., generally at its lowest pH). It is easy for users to see if such a product has been uniformly applied. After the application, the pH of the etching product will rise; and, correspondingly, the etching power becomes weaker due to the reaction of the etching product and substrates, such as metal or concrete. In one embodiment, the etching product would then change color during the etching process (either to another color or to colorless), indicating to the user that the etching performance of the product has changed. This color change mechanism also would allow a user to know when it is time to rinse the etched substrates as well as when the etched surface has been properly rinsed and cleaned.

In one embodiment, the color changing etching product comprises sulfamic acid. In one embodiment, the pH indicator comprises bromocresol green. The solubility of sulfamic acid is about 10% in water. At that concentration, the solution is colorless and has a pH of about 1. Such a solution will be understood to be able to etch concrete or other substrates.

To this solution is added a given amount, preferably about 0.01-0.3% by weight, of bromocresol green. After adding the bromocresol green, the color of sulfamic acid will change from colorless to orange. The etching solution comprising the acid and the indicator is then added to the surface of a substrate, such as concrete. While various intended etching scenarios may require various application techniques, in one exemplary embodiment an even coating is applied to provide an approximately uniform etching to the surface.

After the etching solution is applied to concrete, the etching solution will etch the surface of concrete via acidic interaction as previously described. As it etches, its color will gradually change to green after its etching power becomes weaker due to its chemical reaction with the concrete substrate. The etching will proceed slower, and the etching power of the product will continue to be reduced. The pH of the product will continue to rise to a value of 5 or higher. At the same time the color of the etching product will change to blue. At a pH of 5, the sulfamic acid is essentially no longer able to etch, or at least with respect to its initial abilities. Therefore, a user is able to determine when it is time to rinse the etched concrete substrate (i.e. the reacted etcher and the reacted surface material) based on the color of the etching solution. In addition, due to the colored nature of the etching solution, a user is able to determine when the substrate has been completely rinsed. When the etched area becomes colorless, it will indicate to the user that the etching and cleaning process is complete.

Example 5

Figure 6:
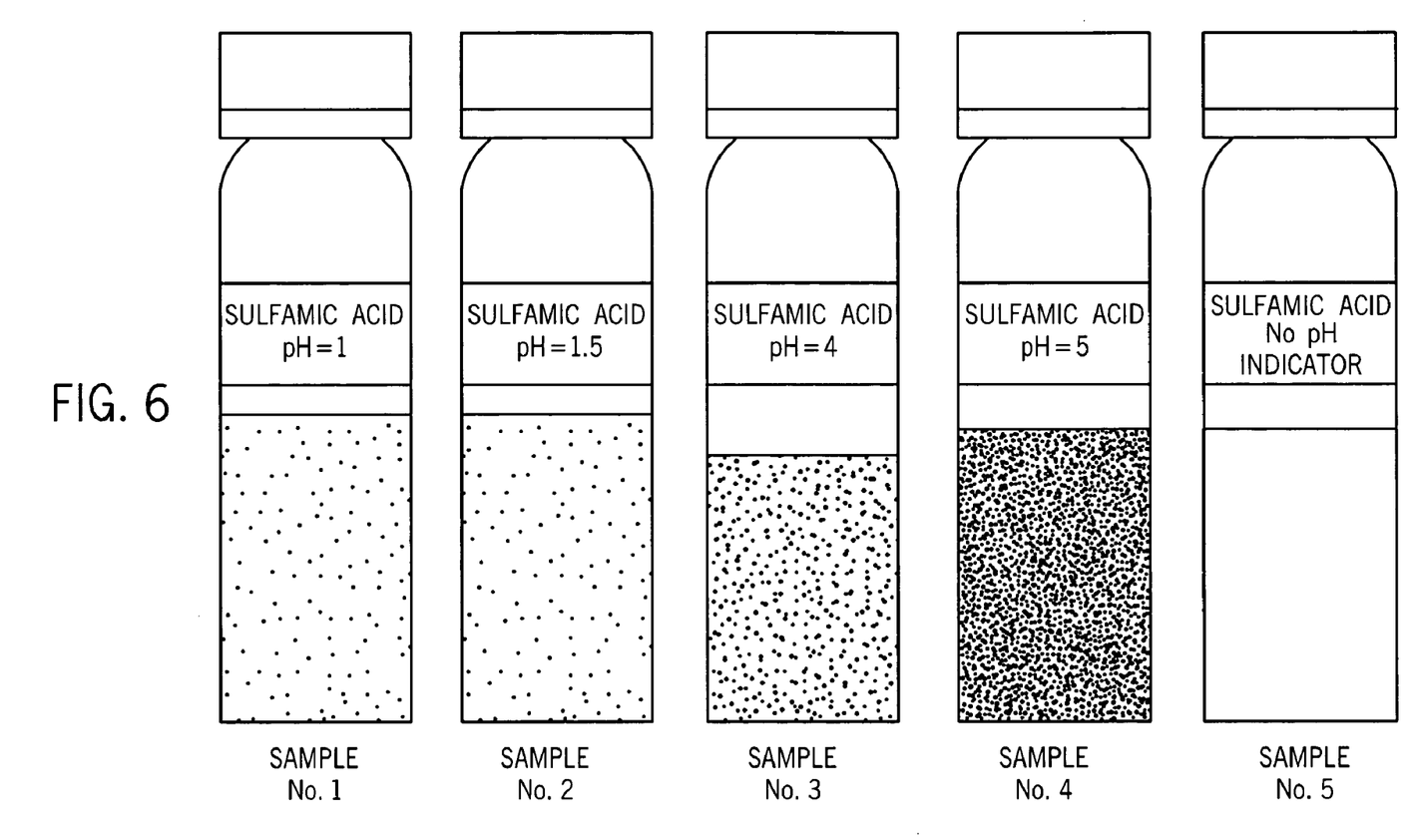
FIG. 6 illustrates five samples of sulfamic acid etcher/cleaner and the sample's color which is dependent on its acidic strength.

FIG. 6 demonstrates an etching product that will show a color change with its acidic strength. Sample No. 5 is a water solution containing 10% sulfamic acid. It is colorless, and its pH value is 1. After adding a given amount of bromocresol green to sample No. 5, it changed color to yellow, as shown in sample No. 1. It is still yellow at pH 1.5 (sample No. 2); but its color gradually changed into green at pH 3 (sample No. 3) and blue at pH 5 (sample No. 4). Thus, the etching solution of the present invention would transition from colorless, to yellow when the pH indicator is added and then from yellow to green to blue as the etcher reacted with the surface of a substrate to which it is applied.

Figure 7:
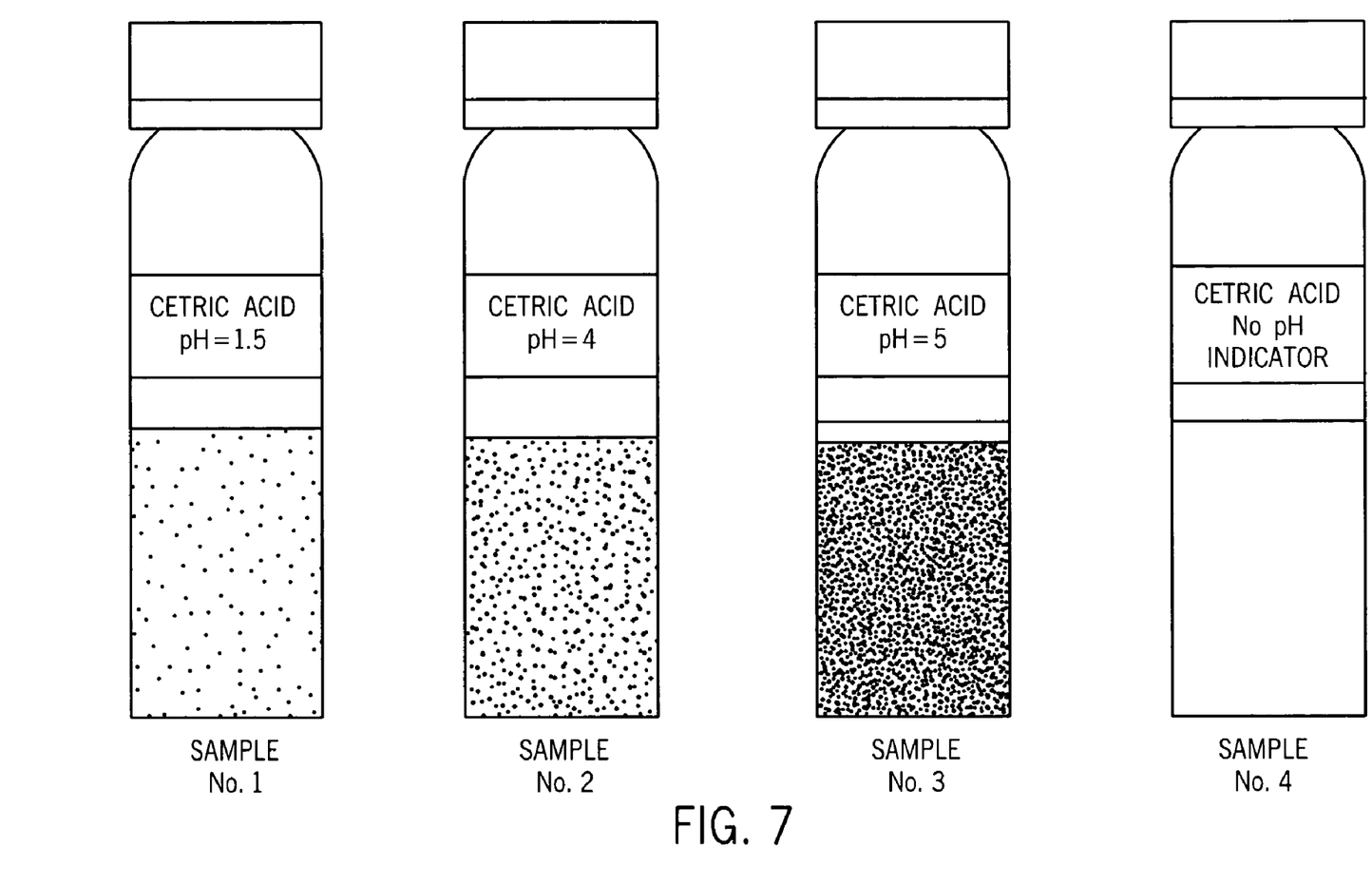
FIG. 7 illustrates four samples of citric acid etcher/cleaner and the sample's color which is dependent on its acidic strength.

FIG. 7 demonstrates another etching product in accordance with the principles of the present invention that will show a color change with its acidic strength. Sample No. 4 is a water solution containing 10% citric acid. It is colorless, and its pH value is 1.5. After adding a given amount of bromocresol green to sample No. 4, it color changed to yellow, as shown in sample No. 1. But, its color gradually changed into green at pH 4 (sample No. 2) and blue at pH 5 (sample No. 3).

Example 6

Figure 8:
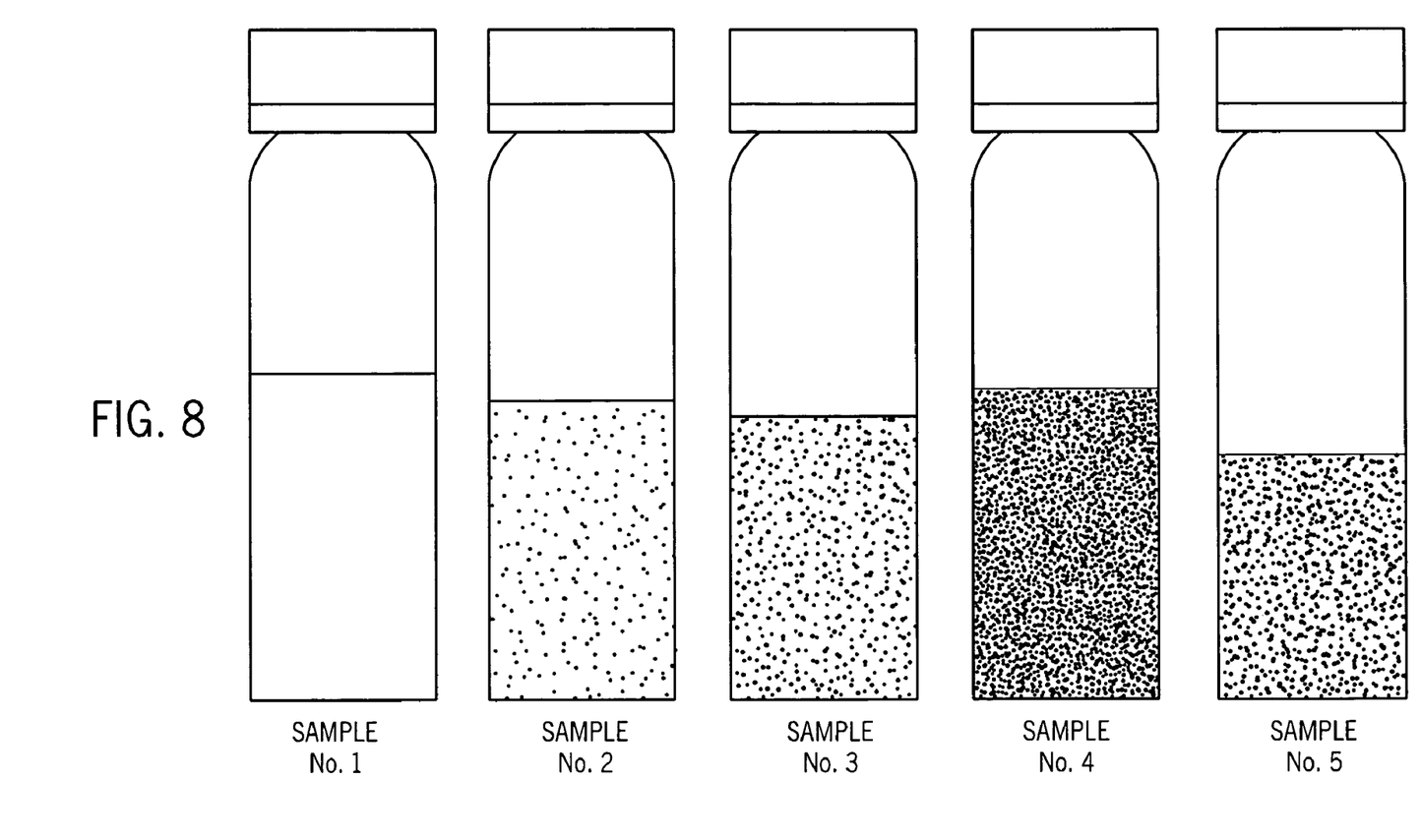
FIG. 8 illustrates five samples of a phosphoric acid etcher/cleaner using bromophenol blue.

FIG. 8 illustrates an etcher composition (weight %) of: 60% phosphoric acid, 33.95% water, 5% solvent, 1% Triton X-100 surfactant, and 0.05% bromophenol blue. As shown in FIG. 8, (from left to right), the pH of the first sample is 0.8, and it is colorless because no pH indicator bromophenol blue is added. The rest of samples contained 0.1% bromophenol blue and they showed yellow, brown, red wine, and purple at pH 0.4, 1.20, 1.7, 3.1, and 5.0, respectively.

Example 7

Figure 9:
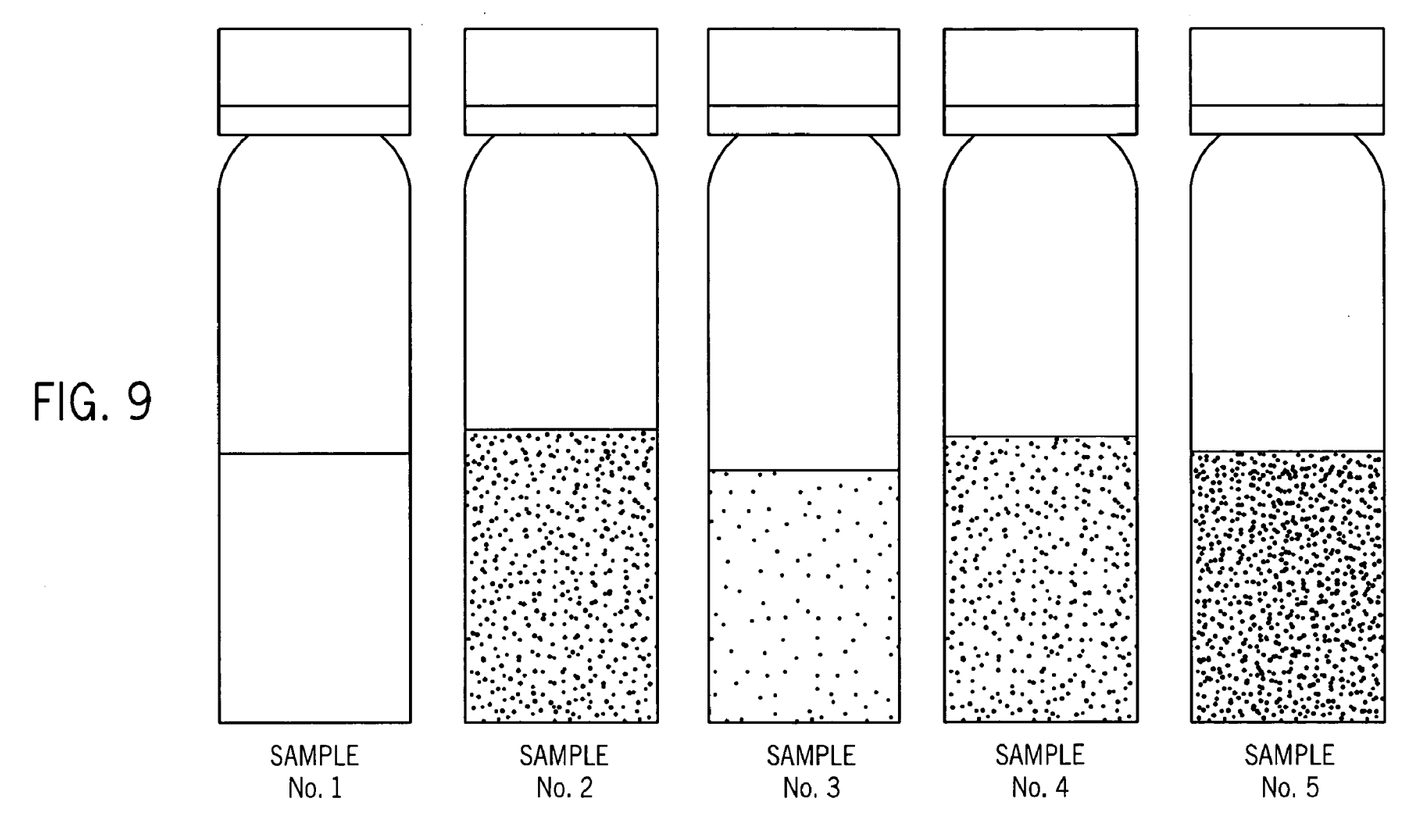
FIG. 9 illustrates five samples of a hydrochloric acid etcher/cleaner using methyl violet pH indicator.

FIG. 9 demonstrates a composition comprising: 0.07% methyl violet pH indicator, 10% hydrochloric acid, and 89.93% water. As shown in FIG. 9 (from left to right), the first sample is the etcher without methyl violet. Other samples changed from green to light blue and to deep blue when the solution pH changed from 0.5 to 1.2 to 1.5 and to 2.5 respectively.

Example 8

Figure 10:
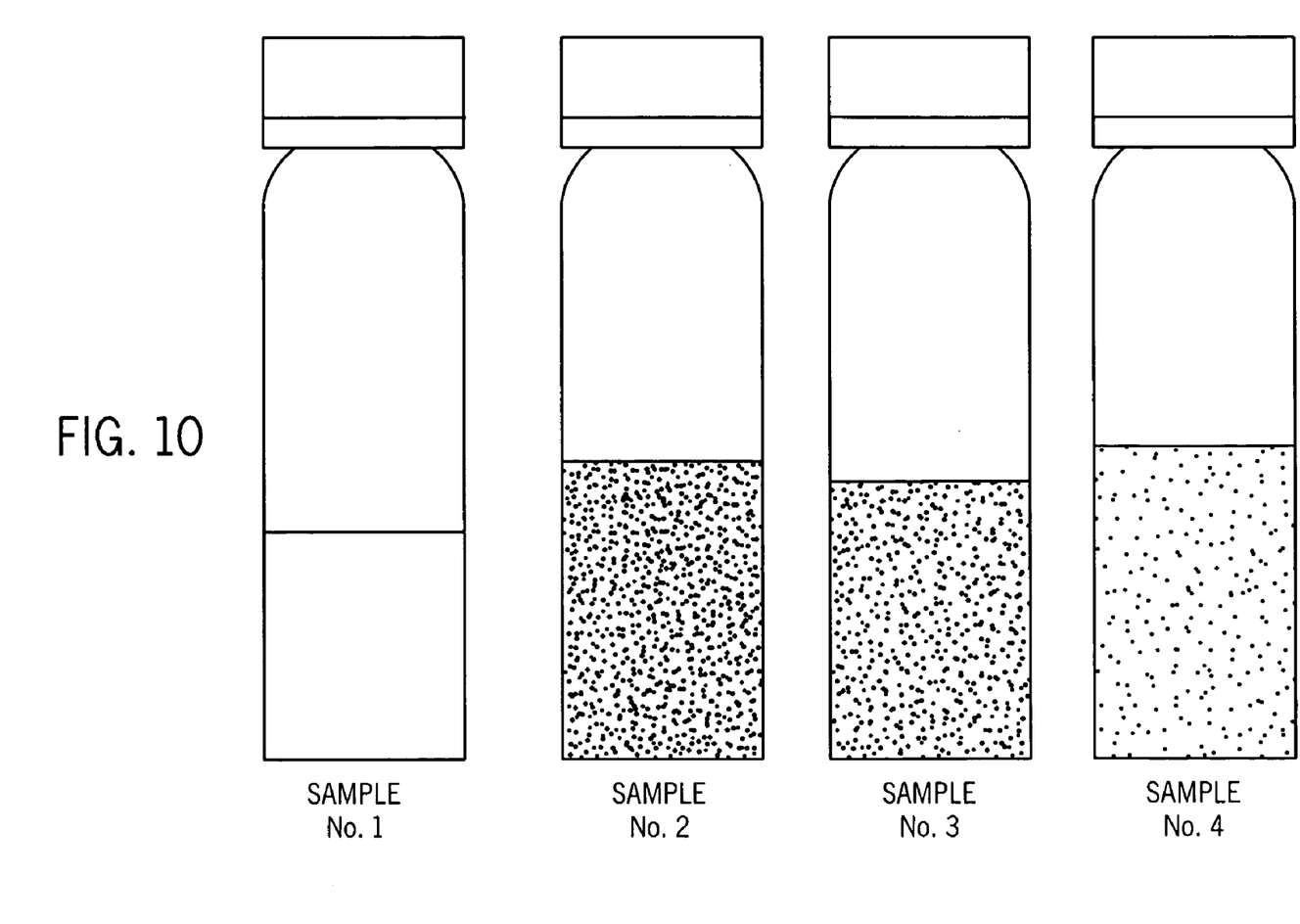
FIG. 10 illustrates four samples of a hydrochloric acid using thymol blue.

FIG. 10 illustrates a composition comprising: 0.01% thymol blue, 10% hydrochloric acid, and 89.99% water. The first sample is colorless because it has no pH indicator thymol blue. The other samples showed deep red, orange, and yellow colors at pH 0.5, 5.3, and 6.1, respectively.

Example 9

Figure 11:
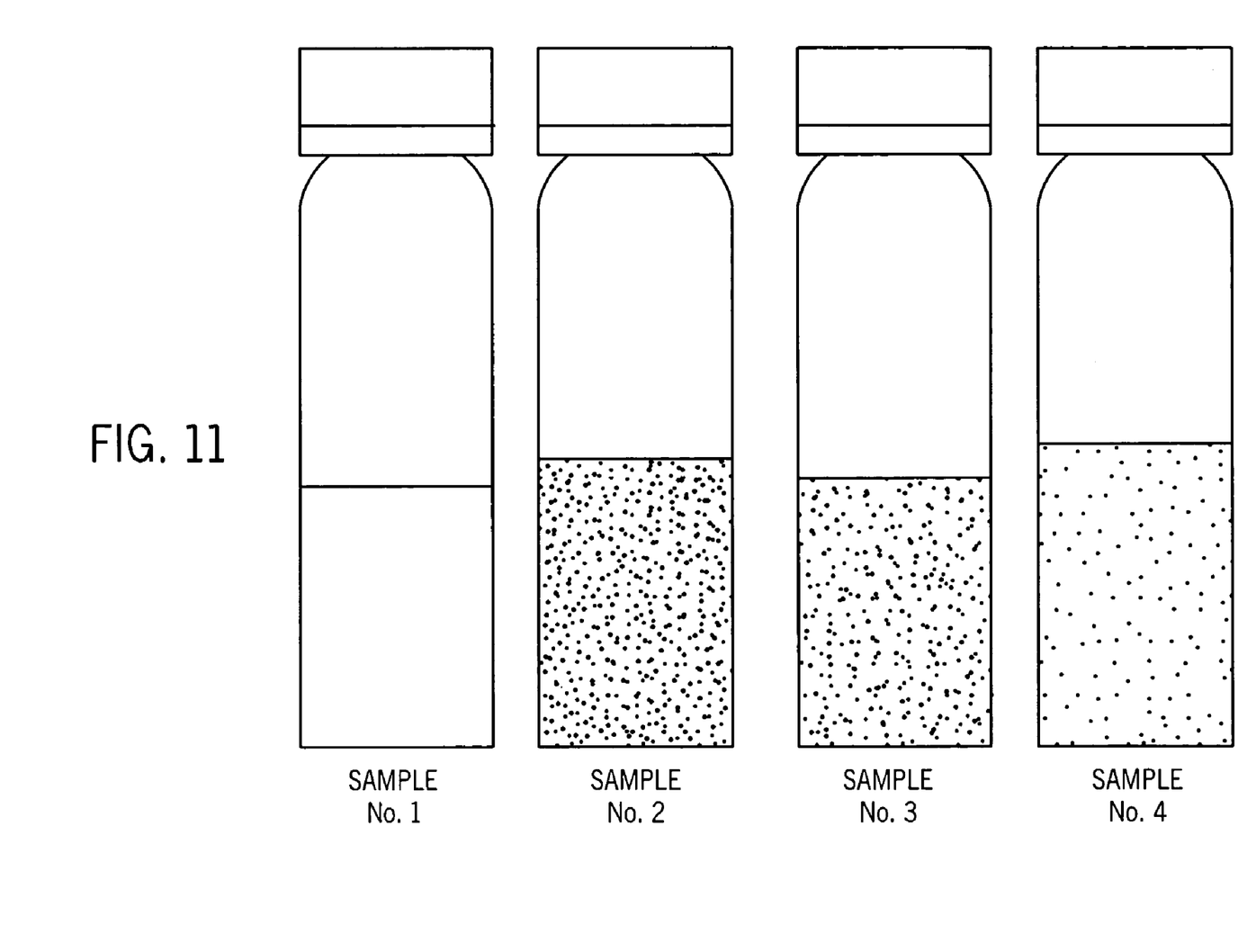
FIG. 11 illustrates four samples of a hydrochloric acid etcher/cleaner and using metacresol purple pH indicator, Triton X-405, and DPnB organic solvent.

FIG. 11 demonstrates a composition comprising: 0.05% metacresol purple pH indicator, 2% Triton X-405, 5% DPnB organic solvent, 9.3% hydrochloric acid, and 83.65% water. From left to right, the first sample is the etcher without metacresol and the other three samples show red, orange, and yellow at pH 0.5, 2.8, and 3.3, respectively.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. Any amounts listed are to be interpreted to include the term about unless otherwise indicated as exact. The embodiments were chosen and described in order to explain the principles of the present invention and its practical application to enable one skilled in the art to utilize the present invention in various embodiments, and with various modifications, as are suited to the particular use contemplated.

What is claimed is:

1. A method of etching a surface of a substrate comprising:
    applying a coating of a color-changing acidic etcher solution to the surface of the substrate, the color changing acidic etcher solution comprising a 0.05 weight % metacresol purple, 2 weight % surfactant, 5 weight % organic solvent, 9.3 weight % hydrochloric acid, and 83.65 weight % water and having a first color at an initial pH below about 7;
    determining by visual inspection of the color of the surface of the substrate if the coating is substantially evenly dispersed on the surface of the substrate;
    reacting the color changing acidic etcher solution with the surface of the substrate causing a raising of the pH of the color changing acidic etcher solution towards neutral (pH 7), the color changing acidic etcher solution having a second color at a pH above the initial pH and corresponding substantially to an endpoint of the acidic etcher/substrate reaction;
    determining by visual inspection of the color of the surface of the substrate if the reaction of the color changing acidic etcher solution is substantially complete;
    rinsing the color changing acidic etcher solution from the surface of the substrate; and
    determining by visual inspection of the color of the surface of the substrate if the acidic etcher solution has been substantially removed from the surface of the substrate.

2. The method of claim 1, further comprising, prior to the application of the coating, adding the acid to the water forming an acidic etcher solution and mixing the acidic etcher solution with the metacresol purple to form the color-changing acid etcher solution.

3. A method of etching a surface of a substrate comprising:
    applying a coating of a color-changing acidic etcher solution to the surface of the substrate, the color changing acidic etcher solution comprising a 10 weight % acid, 0.01 weight % thymol blue, and 89.99 weight % water and having a first color at an initial pH below about 7;
    determining by visual inspection of the color of the surface of the substrate if the coating is substantially evenly dispersed on the surface of the substrate;
    reacting the color changing acidic etcher solution with the surface of the substrate causing a raising of the pH of the color changing acidic etcher solution towards neutral (pH 7), the color changing acidic etcher solution having a second color at a pH above the initial pH and corresponding substantially to an endpoint of the acidic etcher/substrate reaction;

determining by visual inspection of the color of the surface of the substrate if the reaction of the color changing acidic etcher solution if substantially complete;

rinsing the color changing acidic etcher solution from the surface of the substrate; and determining by visual inspection of the color of the surface of the substrate if the acidic etcher solution has been substantially removed from the surface of the substrate.

4. The method of claim 3, wherein the acid is hydrochloric acid.

5. The method of claim 3, wherein the acid is citric acid.

6. The method of claim 3, wherein the acid is sulfamic acid.

7. The method of claim 3, further comprising, prior to the application of the coating, adding the acid to water forming an acidic etcher solution and mixing the acidic etcher solution with the thymol blue to form the color-changing acid etcher solution.

8. A method of etching a surface of a substrate comprising:

applying a coating of a color-changing acidic etcher solution to the surface of the substrate, the color changing acidic etcher solution consisting essentially of a pH indicating dye, a surfactant, an organic solvent, 83.65 weight % to 89.99 weight % water and 9.3 to 10 weight 5 acid, wherein the color-changing acidic etcher solution has a first color at an initial pH below about 7;

determining by visual inspection of the color of the surface of the substrate if the coating is substantially evenly dispersed on the surface of the substrate;

reacting the color changing acidic etcher solution with the surface of the substrate causing a raising of the pH of the color changing acidic etcher solution towards neutral (pH 7), the color changing acidic etcher solution having a second color at a pH above the initial pH and corresponding substantially to an endpoint of the acidic etcher/substrate reaction;

determining by visual inspection of the color of the surface of the substrate if the reaction of the color changing acidic etcher solution is substantially complete;

rinsing the color changing acidic etcher solution from the surface of the substrate; and determining by visual inspection of the color of the surface of the substrate if the acidic etcher solution has been substantially removed from the surface of the substrate.

9. The method of claim 8, wherein the substrate is a concrete substrate.

\* \* \* \* \*